US011955843B2

(12) United States Patent
Tremelling et al.

(10) Patent No.: US 11,955,843 B2
(45) Date of Patent: Apr. 9, 2024

(54) SYNCHRONOUS RELUCTANCE MOTOR

(71) Applicant: ABB Schweiz AG, Baden (CH)

(72) Inventors: Darren Tremelling, Raleigh, NC (US); Elio Perigo, Raleigh, NC (US); Sheng Zhong, Raleigh, NC (US); Lorenzo Mazza, Raleigh, NC (US); Matthew Hoffman, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 124 days.

(21) Appl. No.: 17/559,990

(22) Filed: Dec. 22, 2021

(65) Prior Publication Data

US 2023/0198322 A1 Jun. 22, 2023

(51) Int. Cl.
*H02K 1/24* (2006.01)
*H02K 1/276* (2022.01)
*H02K 19/10* (2006.01)

(52) U.S. Cl.
CPC ............. *H02K 1/246* (2013.01); *H02K 1/276* (2013.01); *H02K 19/103* (2013.01)

(58) Field of Classification Search
CPC ....... H02K 1/246; H02K 1/276; H02K 19/103
USPC ........................................................ 310/46
See application file for complete search history.

(56) References Cited

U.S. PATENT DOCUMENTS

2014/0191607 A1* 7/2014 Huang ..................... H02K 1/27 310/156.08
2019/0207490 A1* 7/2019 Ghoul .................... H02K 1/246
2020/0014289 A1 1/2020 Ko et al.
2021/0104924 A1* 4/2021 Hu ........................ H02K 1/2746
2023/0198322 A1* 6/2023 Tremelling ............ H02K 1/276 310/46

FOREIGN PATENT DOCUMENTS

| CN | 108777520 A | 11/2018 |
| EP | 2790296 | * 10/2014 |
| EP | 3082225 A1 | 10/2016 |
| EP | 3166207 A1 | 5/2017 |
| EP | 3742583 A1 | 11/2020 |
| JP | 2015122838 A | 7/2015 |

(Continued)

OTHER PUBLICATIONS

Wu Qian "Moulding technology based ferrite assisted synchronous reluctance machine" ISBN 978-87-7210-157-6, Aalborg University; (Year: 2018).*

(Continued)

*Primary Examiner* — Ahmed Elnakib
(74) *Attorney, Agent, or Firm* — Greenberg Traurig, LLP

(57) ABSTRACT

The present disclosure relates to a motor. The motor can include a stator defining an interior space, a rotor disposed in the interior space of the stator. The rotor can include a body defining a structure and a plurality of magnets disposed in the plurality of cavities. In some embodiments, the structure defines a plurality of cavities in the body of the rotor, the plurality of cavities includes at least a first cavity and a second cavity, the first cavity is spaced radially outward from the second cavity, and a thickness of the first cavity is larger than a thickness of the second cavity. In some embodiments, at least some of the cavities of the plurality of cavities have a magnet from the plurality of magnets disposed therein.

18 Claims, 4 Drawing Sheets

FIG. 1B

(56) References Cited

FOREIGN PATENT DOCUMENTS

KR      20200075550 A      6/2020
WO   WO 2020015302   *   1/2020

OTHER PUBLICATIONS

Kimmerling, T., "Injection molding cooling time reduction and thermal stress analysis", University of Massachussetts, Amherst MIE 605 Finite Element Analysis, Spring 2002, pp. 1-4, copyright ASME.

Wu, Q., "Moulding technology based ferrite assisted synchronous reluctance machine", ISBN: 978-87-7210-157-6, Publisher: Aalborg University Publishing House, Phd series for the Faculty of Engineering and Science, Aalborg University, https://doi.org/10.5278/VBN.PHD.ENG.00037, 2018.

Wu, Q., et al., "A new application and experimental validation of moulding technology for Ferrite Magnet Assisted Synchronous Reluctance Machine", 8 pages, IEEE Energy Conversion Congress and Exposition, Sep. 18-22, 2016, Milwaukee, Wisconsin.

Dziecheiarz, et al.; "Multi-Physics Design of Synchronous Reluctance Machine for High Speed Applications"; ECON 2016—42nd Annual Conference of the IEEE Industrial Electronics Society, IEEE; Oct. 23, 2016; pp. 1704-1709.

* cited by examiner

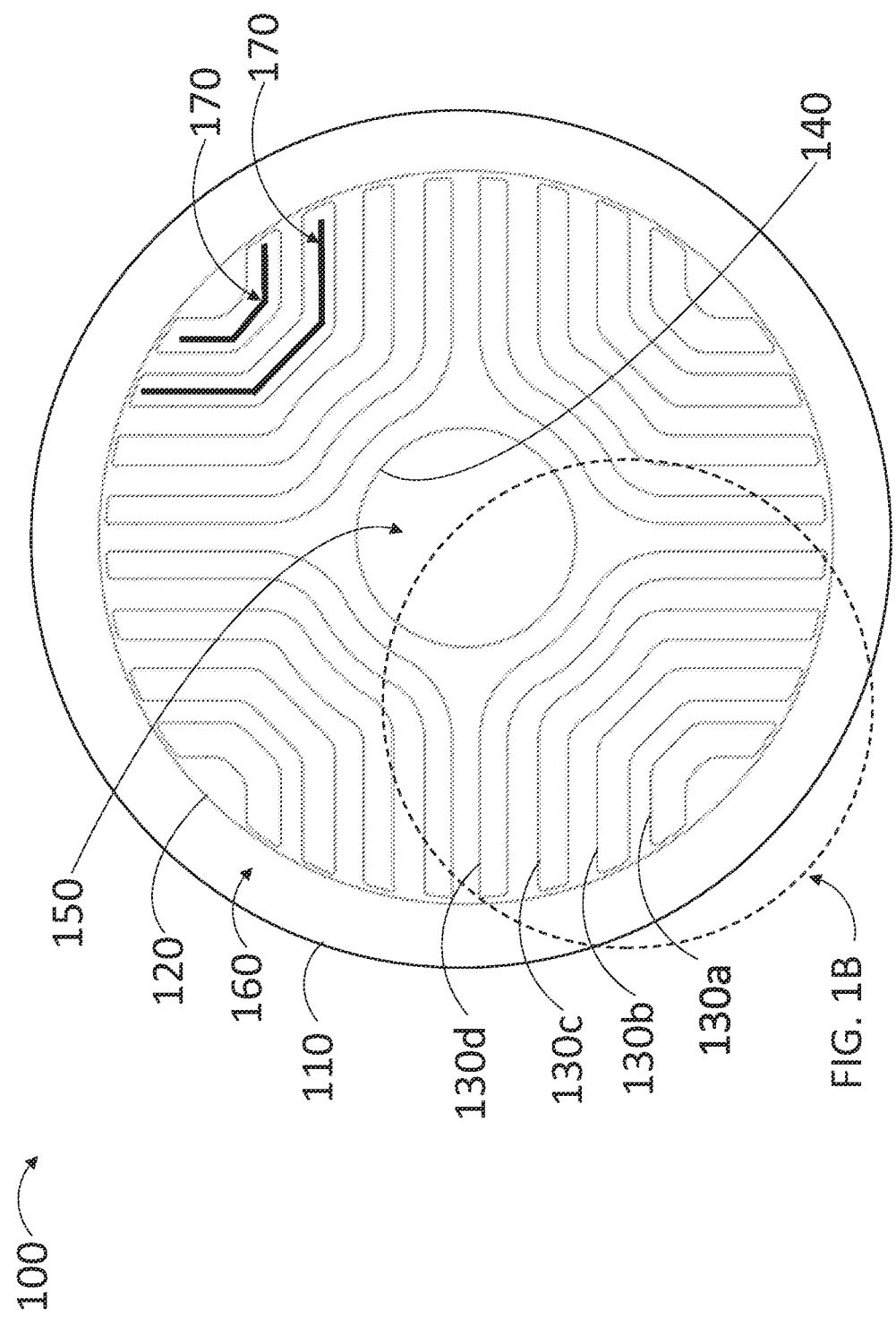

SYNCHRONOUS RELUCTANCE MOTOR

FIELD

The present disclosure relates to the field of synchronous reluctance motors.

BACKGROUND

Motors, such as synchronous reluctance motors, can be used as an alternative to an induction motor. A synchronous reluctance motor has a rotor.

SUMMARY

The present disclosure relates to the systems and methods of permanent magnet assisted synchronous reluctance motors. Permanent magnet synchronous reluctance machines, such as synchronous reluctance motors, can use discrete (sintered) or polymer-bonded (injection molded) magnets. Dimensioning and positioning of the permanent magnets in the lamination of the rotor is focused on enhancing the electromagnetic and mechanical performances of the motor as evidenced by the electrical and mechanical capabilities including, but not limited to, power factor, efficiency, torque capability, torque ripple, and maximum rotational speed.

The present disclosure relates to the design of the cavities of the rotor in the synchronous reluctance motors. In some embodiments, the present disclosure relates to cavities that are wider towards the airgap. That is, the cavities widen, or the cavities have the same thickness with lower span, from the shaft opening toward the airgap. Polymer-bonded magnets can be filled in the cavities and result in overall performance similar to synchronous reluctance machines using sintered counterparts with traditional design concepts. The present disclosure is also capable of enhancing the saliency ratio. In some of the embodiments, the middle portion of the cavity has a concave-shaped portion. In some embodiments, the present disclosure includes cavities that are wider towards the airgap and at least some of the cavities have a concave-shaped portion in the middle portion of the cavity.

Some embodiments of the present disclosure relate to a motor, including: a stator defining an interior space; a rotor disposed in the interior space of the stator, wherein the rotor includes: a body defining a structure, wherein the structure defines a plurality of cavities in the body of the rotor, wherein the plurality of cavities includes at least a first cavity and a second cavity, wherein the first cavity is spaced radially outward from the second cavity, and wherein a thickness of the first cavity is larger than a thickness of the second cavity; and a plurality of magnets disposed in the plurality of cavities, wherein at least some of the cavities of the plurality of cavities have a magnet from the plurality of magnets disposed therein.

In some embodiments, the present disclosure relates to a motor, wherein the thickness of the first cavity is larger than any other thickness of the plurality of cavities.

In some embodiments, the present disclosure relates to a motor, wherein the first cavity is spaced radially outward from all of the cavities of the plurality of cavities.

In some embodiments, the present disclosure relates to a motor, wherein the thickness of the second cavity is larger than a thickness for a cavity spaced radially inward from the second cavity.

In some embodiments, the present disclosure relates to a motor, wherein the thickness of the first cavity is substantially constant along a length of the first cavity.

In some embodiments, the present disclosure relates to a motor, wherein each cavity of the plurality of cavities includes a middle portion, a first cavity arm, and a second cavity arm, wherein the first cavity arm and the second cavity arm extend radially outward from the middle portion.

In some embodiments, the present disclosure relates to a motor, wherein a geometry of the middle portion of the second cavity includes a concave-shaped portion.

In some embodiments, the present disclosure relates to a motor, wherein the concave-shaped portion of the middle portion has a radius of curvature that substantially follows a profile of an internal surface of the rotor, and wherein the internal surface of the rotor defines a shaft opening of the rotor.

In some embodiments, the present disclosure relates to a motor, wherein the motor is a synchronous reluctance motor.

In some embodiments, the present disclosure relates to a motor, wherein the plurality of magnets are polymer-bonded magnets.

Some embodiments of the present disclosure relate to a motor, including: a stator defining an interior space; a rotor disposed in the interior space of the stator, wherein the rotor includes: a body defining a structure, wherein the structure defines a plurality of cavities in the body of the rotor, wherein each cavity of the plurality of cavities includes a middle portion, a first cavity arm, and a second cavity arm, wherein the first cavity arm and the second cavity arm extend radially outward from the middle portion, and wherein a geometry of the middle portion of the second cavity includes a concave-shaped portion; and a plurality of magnets disposed in the plurality of cavities, wherein at least some of the cavities of the plurality of cavities has a magnet from the plurality of magnets disposed therein.

In some embodiments, the present disclosure relates to a motor, wherein the plurality of cavities includes at least a first cavity and a second cavity, wherein the first cavity is spaced radially outward from the second cavity, and wherein a thickness of the first cavity is larger than a thickness of the second cavity.

In some embodiments, the present disclosure relates to a motor, wherein the thickness of the first cavity is larger than any other thickness of the plurality of cavities.

In some embodiments, the present disclosure relates to a motor, wherein the first cavity is spaced radially outward from all of the cavities of the plurality of cavities.

In some embodiments, the present disclosure relates to a motor, wherein the thickness of the second cavity is larger than a thickness for a cavity spaced radially inward from the second cavity.

In some embodiments, the present disclosure relates to a motor, wherein the thickness of the first cavity is substantially constant along a length of the first cavity.

In some embodiments, the present disclosure relates to a motor, wherein the concave-shaped portion of the middle portion has a radius of curvature that substantially follows a profile of an internal surface of the rotor, and wherein the internal surface of the rotor defines a shaft opening of the rotor.

In some embodiments, the present disclosure relates to a motor, wherein at least one cavity of the plurality of cavities has a non-magnetic polymer disposed therein.

In some embodiments, the present disclosure relates to a motor, wherein the motor is a synchronous reluctance motor.

In some embodiments, the present disclosure relates to a motor, wherein the plurality of magnets are polymer-bonded magnets.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIG. 1A depicts a synchronous reluctance motor, in accordance with some embodiments.

DETAILED DESCRIPTION

Figure 1B:
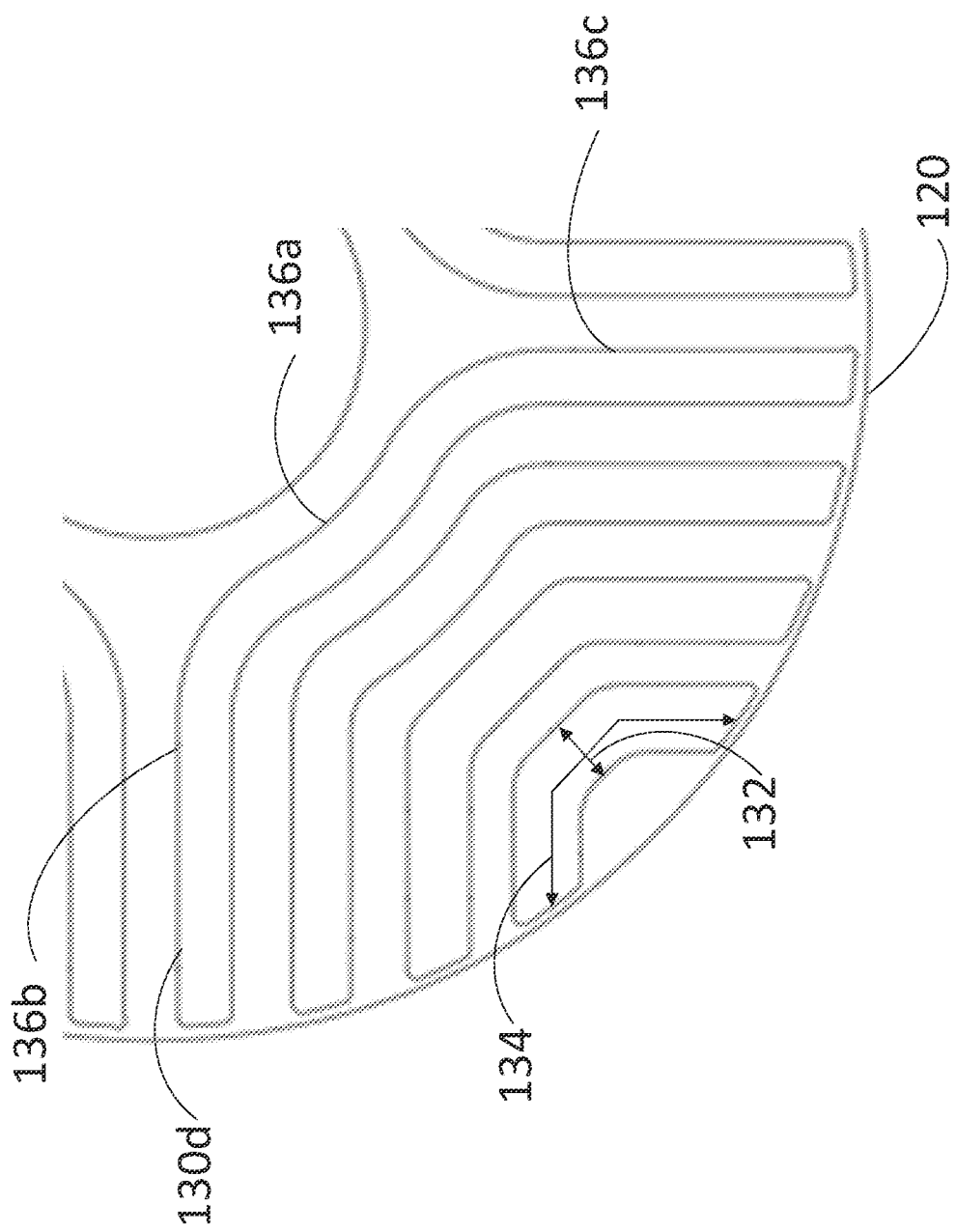
FIG. 1B depicts an enlarged portion of the synchronous reluctance motor of FIG. 1A.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive. The reference to comparative example(s) is for comparative purposes only. No admission of prior art has been made.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

FIG. 1A depicts a synchronous reluctance motor 100, in accordance with some embodiments. FIG. 1B depicts an enlarged portion of the synchronous reluctance motor 100 of FIG. 1A. The synchronous reluctance motor 100 includes a stator 110 and a rotor 120. The stator 110 defines an interior space. The rotor 120 is disposed in the interior space of the stator 110. The rotor 120 includes a body defining a structure. The structure includes a first cavity 130a, a second cavity 130b, a third cavity 130c, and a fourth cavity 130d (collectively referred to as the plurality of cavities 130). That is, the structure of the rotor 120 defines the plurality of cavities 130 in the body of the rotor 120. An internal surface 140 of the rotor 120 defines a shaft opening 150 of the synchronous reluctance motor 100. The spaced defined between the stator 110 and the rotor 120 is defined as an airgap 160.

A plurality of magnets 170 can be disposed in the plurality of cavities 130. In some embodiments, at least some of the plurality of cavities 130 have a magnet from the plurality of magnets 170. In some embodiments, none of the cavities of the plurality of cavities 130 have a magnet from the plurality of magnets 170. In some embodiments, at least one cavity of the plurality of cavities 130 has no magnet. In some embodiments, all of the cavities of the plurality of cavities 130 have a magnet from the plurality of magnets 170. For example, in some embodiments, the first cavity 130a, the second cavity 130b, the third cavity 130c, and the fourth cavity 130d have magnets disposed therein. In some embodiments, the magnets are polymer-bonded magnets. In some embodiments, the plurality of cavities 130 can have a mixture of magnets and non-magnetic polymers. For example, the first cavity 130a, the second cavity 130b, and the fourth cavity 130d can have magnets, and the third cavity 130c can have a non-magnetic polymer. In another example, the first cavity 130a and the second cavity 130b have magnets, the third cavity 130c has no magnet or non-magnetic polymer, and the fourth cavity 130d has a non-magnetic polymer.

The number of cavities of the plurality of cavities 130 can vary. In some embodiments, the number of cavities of the plurality of cavities 130 per pole can be at least two. In some embodiments, the number of cavities of the plurality of cavities 130 per pole can be less than ten. In some embodiments, the number of cavities of the plurality of cavities 130 per pole can range from two to ten. In some embodiments, the number of cavities of the plurality of cavities 130 per pole can range from two to eight. In some embodiments, the number of cavities of the plurality of cavities 130 per pole can range from two to six. In some embodiments, the number of cavities of the plurality of cavities 130 per pole can range from two to four. In some embodiments, the number of cavities of the plurality of cavities 130 per pole can range from four to ten. In some embodiments, the number of cavities of the plurality of cavities 130 per pole can range from six to ten. In some embodiments, the number of cavities of the plurality of cavities 130 per pole can range from eight to ten. For example, as shown in the embodiment of FIG. 1A with four cavities, the number of cavities of the plurality of cavities 130 is greater than two. For example, the number of cavities can also be three or six. In some embodiments, the number of cavities of the plurality of cavities 130 can vary based on the number of poles of the synchronous reluctance motor 100.

As shown in the embodiment of FIG. 1A, the plurality of cavities 130 includes at least the first cavity 130a and the second cavity 130b. The first cavity 130a is spaced radially outward from the second cavity 130b. The second cavity 130b is spaced radially outward from the third cavity 130c. The third cavity 130c is spaced radially outward from the fourth cavity 130d. The first cavity 130a is also spaced radially outward from all the cavities of the plurality of cavities 130, including the first cavity 130a, the second cavity 130b, the third cavity 130c, and the fourth cavity 130d.

As shown in FIG. 1B, each cavity has a thickness 132 and a length 134. The thickness 132 of the first cavity 130a is larger, or the same size as, than any other thickness 132 of the plurality of cavities 130. For example, FIG. 1A shows the thickness 132 of the first cavity 130a is larger than a thickness 132 of the second cavity 130b and larger than any other thickness 132 of the plurality of cavities 130.

In some embodiments, for each cavity of the plurality of cavities 130, the thickness 132 for a cavity spaced radially outward, if present, is larger and a thickness for a cavity spaced radially inward, if present, is smaller. For example, for the first cavity 130a, there is no cavity spaced radially outward (a cavity is not present); the thickness 132 of the cavity spaced radially inward from the first cavity 130a, the thickness 132 of the second cavity 130b (a cavity is present), is smaller. For the thickness 132 of the second cavity 130b, the thickness 132 of the first cavity 130a spaced radially outward is larger (a cavity is present), and the thickness 132 of the third cavity 130c spaced radially inward is smaller (a cavity is present). For the thickness 132 of the fourth cavity 130d, the thickness 132 of the third cavity 130c spaced radially outward is larger (a cavity is present). There is no cavity spaced radially inward from the fourth cavity 130d (no cavity is present). In some embodiments, the thickness 132 of the plurality of cavities 130 are progressively larger, or have the same thickness 132 with a lower span instead of a having a larger thickness 132, as the cavities of the plurality of cavities 130 progress radially outwards toward the airgap 160; similarly, in some of the embodiments, the thickness 132 of the cavities of the plurality of cavities 130 are progressively smaller, or have the same thickness 132 with a higher span instead of having a smaller thickness 132, as the cavities of the plurality of cavities 130 progress radially inwards toward the shaft opening 150 (i.e., away from the airgap 160).

As shown in FIG. 1B, each cavity of the plurality of cavities 130 includes a middle portion 136a, a first cavity arm 136b, and a second cavity arm 136c. The first cavity arm 136b and the second cavity arm 136c extend radially outward from the middle portion 136a. The middle portion 136a extends between the transition to the sections (i.e., first cavity arm 136b and the second cavity arm 136c) that extend substantially radially.

In some embodiments, the thickness 132 of each cavity of the plurality of cavities 130 is constant or substantially constant along the length 134 of each cavity. For example, the thickness 132 at the first cavity arm 136b, the thickness 132 at the middle portion 136a, and the thickness 132 at the second cavity arm 136c can be the same or substantially similar.

In some embodiments, a geometry of the middle portion 136a of the cavities of the plurality of cavities 130 can have a concave-shaped portion. The internal surface 140 of the rotor 120 defines a shaft opening 150 of the rotor 120. In some embodiments, the concave-shaped portion of the middle portion 136a has a radius of curvature that substantially follows a profile of the internal surface 140 of the rotor 120 that defines the shaft opening 150. The concave-shaped portion can extend for the full length of the middle portion 136a. That is, the concave shaped portion can extend between the transition of the first cavity arm 136a and the middle portion 136a to the transition of second cavity arm 136c and the middle portion 136a.

FIG. 1A shows the rotor 120 with four poles including a concave-shaped portion for the middle portion 136a of some of the cavities for the plurality of cavities 130. In some embodiments, the rotor 120 can have two poles and also include the concave-shaped portion for the middle portion 136a of some of the cavities for the plurality of cavities 130.

In some embodiments, the rotor 120 can have six or more poles. For example, in some embodiments, the rotor 120 can have 12 poles. For larger synchronous reluctance motor 100, a higher number of poles (that is more than 4 poles) may be needed. In some embodiments, the rotor 120 can have up to 200-400 mm pole pitch (span). For example, the rotor 120 can have 60 mm pole pitch.

In some embodiments, with larger pole count (e.g., greater than six poles), the concave-shaped portion for the middle portion 136a of the cavities is not present, while maintaining the increasing thickness 132 from the innermost cavity (i.e., the cavity that is closest to the shaft opening 150, the first cavity 130a) to the outermost cavity (i.e., the cavity that is closest to the airgap 160, the fourth cavity 130d).

The rotor 120 has a plurality of laminations. In some embodiments, the plurality of laminations include a soft magnetic material (e.g., electrical non-grain oriented laminations) due to higher tensile strength (with increasing percentage of silicon). In some embodiments, each lamination of the plurality of laminations can have up to 3% (mass percent) silicon. In some embodiments, some laminations, but not all laminations, can have up to 3% (mass percent) silicon. In some embodiments, the laminations have up to 2.5% (mass percent) silicon. In some embodiments, the laminations have up to 2% (mass percent) silicon. In some embodiments, the laminations have up to 1.5% (mass percent) silicon. In some embodiments, the laminations have up to 1% (mass percent) silicon. In some embodiments, the laminations have up to 0.5% (mass percent) silicon. In some embodiments, the laminations have from 1% (mass percent) silicon to 3% (mass percent) silicon.

In some embodiments, a thickness of the laminations can be about 0.35 mm or about 0.5 mm. In some embodiments, for example a large synchronous reluctance motor 100, the laminations can be larger (e.g., 2 mm). In some embodiments, the thickness of the laminations ranges from 0.1 mm to 2 mm. In some embodiments, the thickness of the laminations ranges from 0.1 mm to 1.5 mm. In some embodiments, the thickness of the laminations ranges from 0.1 mm to 1 mm. In some embodiments, the thickness of the laminations ranges from 0.1 mm to 0.5 mm. In some embodiments, the thickness of the laminations ranges from 0.5 mm to 2 mm. In some embodiments, the thickness of the laminations ranges from 1 mm to 2 mm. In some embodiments, the thickness of the laminations ranges from 1.5 mm to 2 mm.

EXAMPLES

Example 1

Figure 2B:
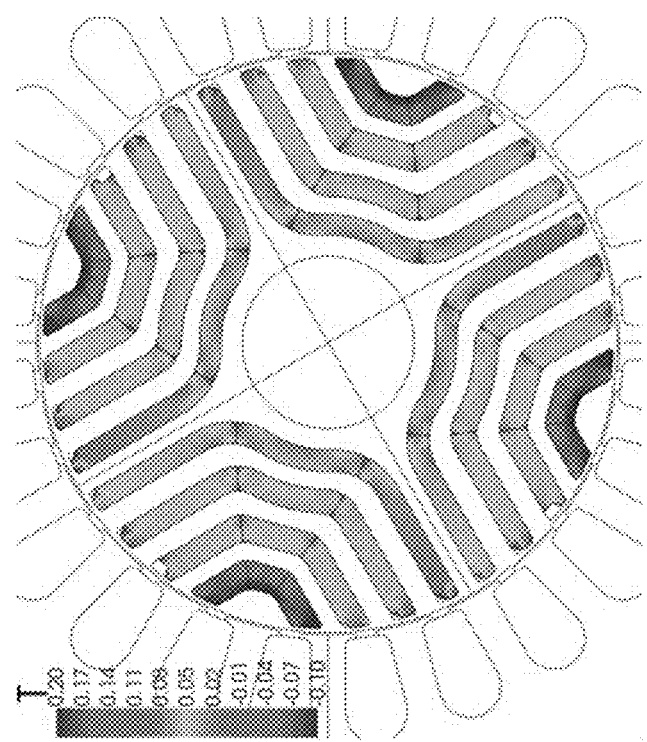
FIG. 2A and FIG. 2B depict a demagnetization pattern of a rotor, in accordance with some embodiments.
Figure 2A:
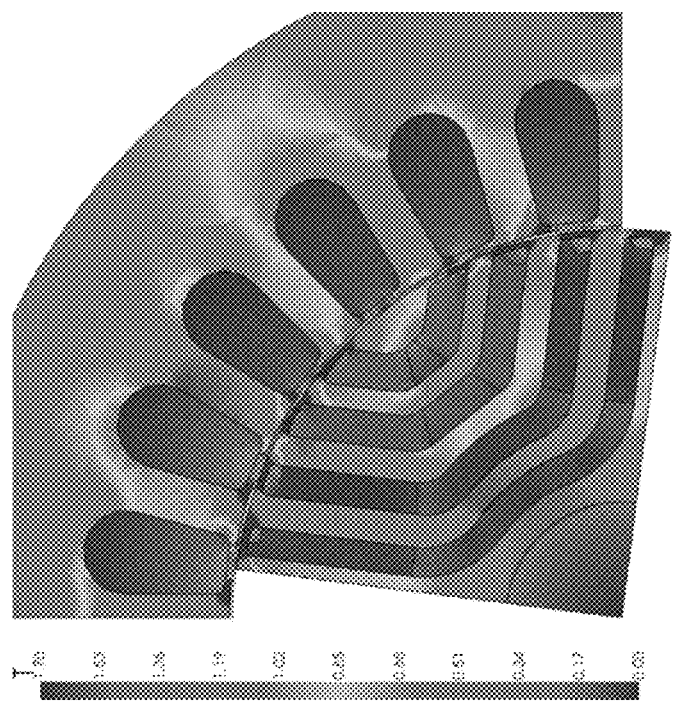

FIG. 2A and FIG. 2B depict a demagnetization pattern of a rotor (e.g., the rotor 120), in accordance with some embodiments. Due to its counterintuitive nature, evaluations have been made to understand demagnetization patterns of the rotor, which is shown in FIG. 2A and FIG. 2B. At 3× of nominal rating the magnet closest to the airgap—the thickest—(e.g., the magnet in the first cavity 130a) presents virtually no demagnetization; concerning the remaining magnets (e.g., the magnets in the second cavity 130b, the third cavity 130c, and the fourth cavity 130d), the edges of the magnets demonstrate about 2.5% (in total) of demagnetization. FIG. 2A illustrates magnetic flux density, which is shown to be below saturation levels in both stator and rotor flux paths. FIG. 2B illustrates same for permanent magnets alone, illustrating the safe region of operation relative to demagnetization. Magnetization analysis gives motivation of reduction in outermost cavity thickness to ease demagnetization (yet not strongly diminish demagnetization capability). The increase in cavity thickness partially compensates for reduced cavity volume, mitigating premature polymer freezing (e.g., polymer bonded magnets) during injection and providing a relatively balanced injection.

Example 2

Figure 3:
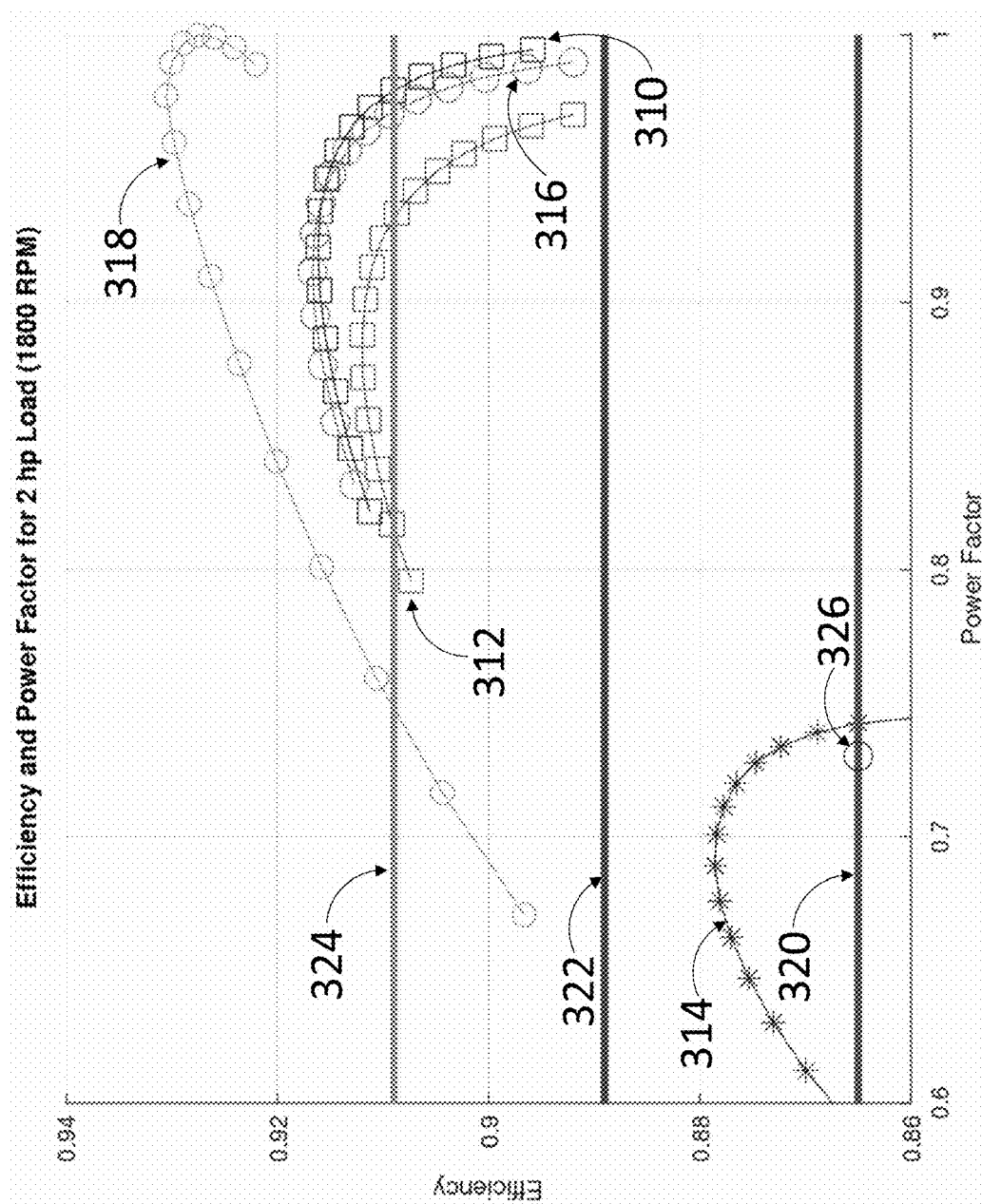
FIG. 3 depicts a comparison between efficiency versus power factor for different types of motors, in accordance with some embodiments.

FIG. 3 depicts a comparison between efficiency versus power factor for different types of motors (e.g., synchronous reluctance motor 100), in accordance with some embodiments. FIG. 3 presents the comparison of efficiency versus power factor of current two-horsepower induction motor (of larger frame size) and synchronous reluctance-based machines (all of same frame size and stack length) of same power with distinct magnet types (sintered and polymer-bonded) and lamination features (e.g., no magnets and cavities larger closer to the airgap—similar rotor as the rotor 120). A two-horsepower motor with sintered magnet and a comparative geometry 310, a two-horsepower motor with polymer-bonded magnet type with comparative geometry 312, a two-horsepower motor with no magnet with comparative geometry 314, and a two-horsepower induction motor 326 are shown for comparative purposes only. In addition, the standards for the National Electrical Manufacturers Association (NEMA) are also shown for comparative purposes, including NEMA Premium Efficiency 320, NEMA Super Premium Efficiency 322, and NEMA Ultra Premium Efficiency 324. Designs using geometry of the present disclosure (e.g., the design of the rotor 120) are compared as well, including a two-horsepower motor with polymer-bonded magnet (316) and a two-horsepower motor with polymer-bonded magnet—NEO (Neodymium NdFeB magnets) (318). Overall performance between synchronous machines utilizing geometries of comparative examples (e.g., the two-horsepower motor with sintered magnet and a comparative geometry 310 and the two-horsepower motor with polymer-bonded magnet type with comparative geometry 312) and example geometry (for polymer-bonded hard magnets) designs for the present disclosure (e.g., the two-horsepower motor with polymer-bonded magnet (316) and the two-horsepower motor with polymer-bonded magnet—NEO (318)) is equivalent to machines of comparative examples with sintered magnets and superior when compared to a comparative example of a synchronous reluctance motor with no magnet (e.g., the two-horsepower motor with no magnet with comparative geometry 314) or its induction counterpart (e.g., the two-horsepower induction motor 326). In addition, saliency ratios from comparative examples and Examples with geometries of the present disclosure lamination designed are listed in Table 1, as shown below. The proposed construction and design of the present disclosure offers a higher saliency ratio (Lq/Ld ratio), not still considering benefits of strain hardening, which is shown to increase it at least 10% and taking to 7 or above. The reference to comparative example(s) is for comparative purposes only. No admission of prior art has been made.

TABLE 1

Saliency ratio of comparative examples (sintered ferrite) and an Example of the present disclosure (for polymer-bonded magnet) lamination geometries.

| Lamination | Saliency Ratio |
| --- | --- |
| comparative examples | 4.0 |
| Example | 7.0 |

ASPECTS

Various Aspects are described below. It is to be understood that any one or more of the features recited in the following Aspect(s) can be combined with any one or more other Aspect(s).

Aspect 1. A motor, comprising: a stator defining an interior space; a rotor disposed in the interior space of the stator, wherein the rotor includes: a body defining a structure, wherein the structure defines a plurality of cavities in the body of the rotor, wherein the plurality of cavities comprises at least a first cavity and a second cavity, wherein the first cavity is spaced radially outward from the second cavity, and wherein a thickness of the first cavity is larger than a thickness of the second cavity; and a plurality of magnets disposed in the plurality of cavities, wherein at least some of the cavities of the plurality of cavities have a magnet from the plurality of magnets disposed therein.

Aspect 2. The motor of Aspect 1, wherein the thickness of the first cavity is larger than any other thickness of the plurality of cavities.

Aspect 3. The motor of Aspect 1 or 2, wherein the first cavity is spaced radially outward from all of the cavities of the plurality of cavities.

Aspect 4. The motor as in any of the preceding Aspects, wherein the thickness of the second cavity is larger than a thickness for a cavity spaced radially inward from the second cavity.

Aspect 5. The motor as in any of the preceding Aspects, wherein the thickness of the first cavity is substantially constant along a length of the first cavity.

Aspect 6. The motor as in any of the preceding Aspects, wherein each cavity of the plurality of cavities comprises a middle portion, a first cavity arm, and a second cavity arm, wherein the first cavity arm and the second cavity arm extend radially outward from the middle portion.

Aspect 7. The motor of Aspect 6, wherein a geometry of the middle portion of the second cavity comprises a concave-shaped portion.

Aspect 8. The motor of Aspect 7, wherein the concave-shaped portion of the middle portion has a radius of curvature that substantially follows a profile of an internal surface of the rotor, and wherein the internal surface of the rotor defines a shaft opening of the rotor.

Aspect 9. The motor as in any of the preceding Aspects, wherein the motor is a synchronous reluctance motor.

Aspect 10. The motor as in any of the preceding Aspects, wherein the plurality of magnets are polymer-bonded magnets.

Aspect 11. A motor, comprising: a stator defining an interior space; a rotor disposed in the interior space of the stator, wherein the rotor includes: a body defining a structure, wherein the structure defines a plurality of cavities in the body of the rotor, wherein each cavity of the plurality of cavities comprises a middle portion, a first cavity arm, and a second cavity arm, wherein the first cavity arm and the second cavity arm extend radially outward from the middle portion, and wherein a geometry of the middle portion of the second cavity comprises a concave-shaped portion; and a plurality of magnets disposed in the plurality of cavities, wherein at least some of the cavities of the plurality of cavities has a magnet from the plurality of magnets disposed therein.

Aspect 12. The motor of Aspect 11, wherein the plurality of cavities comprises at least a first cavity and a second cavity, wherein the first cavity is spaced radially outward from the second cavity, and wherein a thickness of the first cavity is larger than a thickness of the second cavity.

Aspect 13. The motor of Aspect 11 or 12, wherein the thickness of the first cavity is larger than any other thickness of the plurality of cavities.

Aspect 14. The motor as in any of the preceding Aspects, wherein the first cavity is spaced radially outward from all of the cavities of the plurality of cavities.

Aspect 15. The motor as in any of the preceding Aspects, wherein the thickness of the second cavity is larger than a thickness for a cavity spaced radially inward from the second cavity.

Aspect 16. The motor as in any of the preceding Aspects, wherein the thickness of the first cavity is substantially constant along a length of the first cavity.

Aspect 17. The motor as in any of the preceding Aspects, wherein the concave-shaped portion of the middle portion has a radius of curvature that substantially follows a profile of an internal surface of the rotor, and wherein the internal surface of the rotor defines a shaft opening of the rotor.

Aspect 18. The motor as in any of the preceding Aspects, wherein at least one cavity of the plurality of cavities has a non-magnetic polymer disposed therein.

Aspect 19. The motor as in any of the preceding Aspects, wherein the motor is a synchronous reluctance motor.

Aspect 20. The motor as in any of the preceding Aspects, wherein the plurality of magnets are polymer-bonded magnets.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A motor, comprising:
a stator defining an interior space;
a rotor disposed in the interior space of the stator, wherein the rotor includes:
a body defining a structure, wherein the structure defines a plurality of cavities in the body of the rotor,
wherein the plurality of cavities comprises:
a first cavity,
a second cavity, and
a third cavity,
wherein the first cavity is spaced radially outward from the second cavity and the third cavity, and the second cavity is spaced radially outward from the third cavity, and
wherein a thickness of the first cavity is larger than a thickness of the second cavity and a thickness of the third cavity,
wherein the thickness of the second cavity is larger than the thickness of the third cavity;
wherein the thickness of the second cavity is larger than a thickness for a cavity spaced radially inward from the second cavity and the third cavity; and
a plurality of magnets disposed in the plurality of cavities, wherein at least some of the cavities of the plurality of cavities have a magnet from the plurality of magnets disposed therein.

2. The motor of claim 1,
wherein the thickness of the first cavity is larger than any other thickness of the plurality of cavities.

3. The motor of claim 2,
wherein the first cavity is spaced radially outward from all of the cavities of the plurality of cavities.

4. The motor of claim 1,
wherein the thickness of the first cavity is substantially constant along a length of the first cavity.

5. The motor of claim 1,
wherein each cavity of the plurality of cavities comprises a middle portion, a first cavity arm, and a second cavity arm,
wherein the first cavity arm and the second cavity arm extend radially outward from the middle portion.

6. The motor of claim 5,
wherein a geometry of the middle portion of the second cavity comprises a concave-shaped portion.

7. The motor of claim 6,
wherein the concave-shaped portion of the middle portion has a radius of curvature that substantially follows a profile of an internal surface of the rotor, and
wherein the internal surface of the rotor defines a shaft opening of the rotor.

8. The motor of claim 1,
wherein the motor is a synchronous reluctance motor.

9. The motor of claim 1,
wherein the plurality of magnets are polymer-bonded magnets.

10. A motor, comprising:
a stator defining an interior space;
a rotor disposed in the interior space of the stator, wherein the rotor includes:

a body defining a structure, wherein the structure defines a plurality of cavities in the body of the rotor, wherein the plurality of cavities comprises at least a first cavity, a second cavity, and a third cavity, wherein the first cavity is spaced radially outward from the second cavity and the third cavity, and the second cavity is spaced radially outward from the third cavity, wherein a thickness of the first cavity is larger than a thickness of the second cavity and the third cavity, wherein a thickness of the second cavity is larger than a thickness of the third cavity, wherein each cavity of the plurality of cavities comprises a middle portion, a first cavity arm, and a second cavity arm, and wherein the first cavity arm and the second cavity arm extend radially outward from the middle portion, wherein a geometry of the middle portion of the cavity comprises a concave-shaped portion; and a plurality of magnets disposed in the plurality of cavities, wherein at least some of the cavities of the plurality of cavities has a magnet from the plurality of magnets disposed therein.

11. The motor of claim 10,
wherein the thickness of the first cavity is larger than any other thickness of the plurality of cavities.

12. The motor of claim 10,
wherein the first cavity is spaced radially outward from all of the cavities of the plurality of cavities.

13. The motor of claim 10,
wherein the thickness of the second cavity is larger than the thickness of the third cavity and a thickness for a cavity spaced radially inward from the second cavity and the third cavity.

14. The motor of claim 10,
wherein the thickness of the first cavity is substantially constant along a length of the first cavity.

15. The motor of claim 10,
wherein the concave-shaped portion of the middle portion has a radius of curvature that substantially follows a profile of an internal surface of the rotor, and
wherein the internal surface of the rotor defines a shaft opening of the rotor.

16. The motor of claim 10,
wherein at least one cavity of the plurality of cavities has a non-magnetic polymer disposed therein.

17. The motor of claim 10, wherein the motor is a synchronous reluctance motor.

18. The motor of claim 10, wherein the plurality of magnets are polymer-bonded magnets.

* * * * *